Patented June 23, 1931

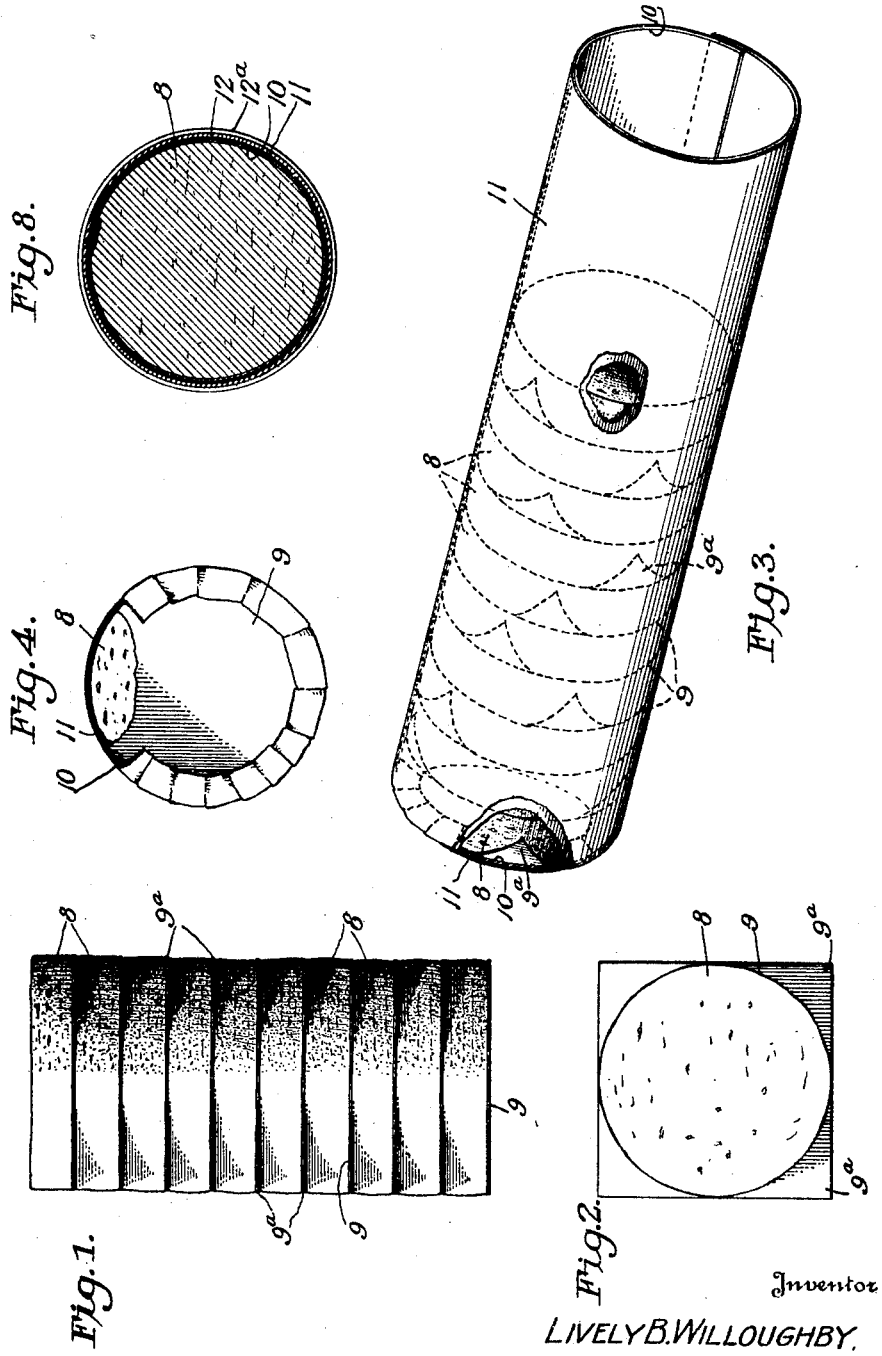

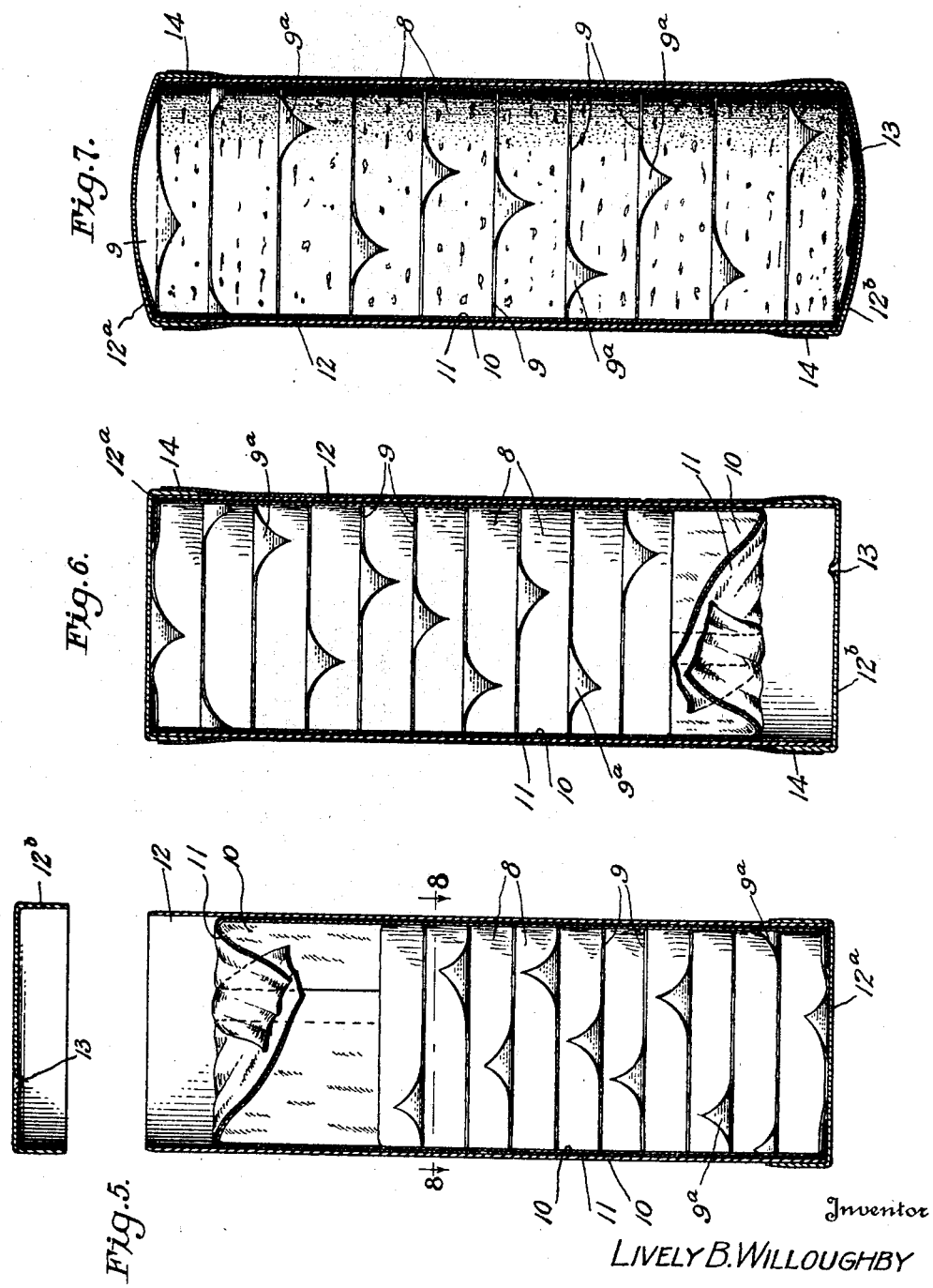

1,811,772

UNITED STATES PATENT OFFICE

LIVELY B. WILLOUGHBY, OF LOUISVILLE, KENTUCKY, ASSIGNOR TO BALLARD & BALLARD COMPANY, OF LOUISVILLE, KENTUCKY, A CORPORATION OF KENTUCKY

METHOD AND MEANS OF PACKETING DOUGH

Application filed March 10, 1931. Serial No. 521,599. REISSUED

This invention relates to packaging, with reference more especially to food products for merchandising purposes and constitutes an improvement upon that set forth in my copending application Serial No. 509,186 filed January 16, 1931, for a process of packing uncooked food products, of which the present case forms a continuation in part.

It aims to provide a method and means of packeting or packaging raw or unbaked leavened dough formations such as rolls or biscuits, crullers and the like so as to preserve them in condition for baking or cooking to edible state and make it practical to commercialize the same to meet the demand for various bread articles which the housewife can bake or cook fresh without the trouble of preparing and molding the dough. This has not heretofore been feasible because of the soft and readily spoilable nature of leavened dough as distinguished from shortened or pastry dough presents difficulties in packaging in salable form which have not until now been satisfactorily overcome.

The invention will be best understood from further description with reference to the attached drawings illustrating one practicable embodiment thereof in the form of a tubular packet of unbaked rolls.

In said drawings:

Fig. 1 represents a number of unbaked rolls as stacked for packaging together;

Fig. 2 exemplifies a plan view of the top or any roll in the stack;

Fig. 3 is a perspective view of the stack of rolls as jacketed in a protective wrapper crimped over one end thereof;

Fig. 4 is a view illustrating the wrapper crimping over one end of the stack;

Fig. 5 is a view in longitudinal section showing the jacketed stack of rolls as applied in a tubular container having attachable cap;

Fig. 6 is a similar view showing the container capped and inverted with the stack of rolls partially expanded therewithin;

Fig. 7 is another similar view showing the stack of rolls fully expanded in the container; and Fig. 8 is a transverse section taken on the line 8—8 of Fig. 5.

In the illustrative embodiment, the desired number of rolls or other moldings 8 of dough freshly mixed with leavening ingredient are placed together in stack relation as shown in Fig. 1.

Between these stacked formations a separating material is placed. This material represented by wafers 9 and hereinafter referred to as "separators" advantageously comprises pieces of a thin, flexible and nonadhering sheet-material such as paper foil, although some liquid or powdered substance might satisfactorily serve the purpose. In using water-sheets as here shown, it is preferable to cut them to square shape so that their corners may bend over to form flaps or tabs 9ª facilitating removal and separation of the rolls when the packet is later broken open. It is desirable to apply a thin coating of a liquid shortening such as melted lard over both surfaces of these separators or else to the rolls themselves in order to make subsequent removal and separation of the rolls still easier. One of the separators is shown placed under the lowermost roll of the stack so as to cover its outer face for a purpose which will later become apparent. Another may for like reason be placed on top of the uppermost roll of the stack, although it is not generally necessary.

The stack of rolls is then unitarily enveloped or wrapped in a sheet 10 in this instance of the same material as the separators, with a crimping or folding close over the aforesaid lowermost roll and a mere gathering or loose folding over the aforesaid uppermost roll. In hand wrapping, or simple jacketing as in this case, it is expedient to lay the stack horizontally upon the enveloping sheet first rested in a trough-like or semicylindrical tray (not shown) and drawing the sheet thereover with an overlapping at or along the side while crimping it over one end pressed against a back-plate of the tray and gathering or folding it loosely at the other end. The separator applied over the outer face of the lowermost roll as before mentioned assures its full coverage if the wrapper crimping or folding thereover should not be sufficient or extensive enough for the purpose (see Fig. 4), while that which might be applied to the outer face of the uppermost roll would assure the latter's coverage if the gathering or loose folding thereover should spread open too far under later expansion, which however rarely happens so that it is not generally necessary as before stated.

Said jacketing sheet, like the aforedescribed separators, is given a thin coating of liquid shortening such as melted lard over its inner surface so as to provide for free slippage movement of the rolls along its encasing sides, as also to make its subsequent removal therefrom easier. It serves as a liner for the container into which the encased stack is put and may for reinforcement have a backing sheet 11 of thin paper, paraffined or not as preferred.

The stack of rolls thus wrapped is inserted into an inflexible container or cylindrical cardboard tube 12 in this instance, having a fixed closure as by cap 12ª at one end and an attachable closure as by cap 12ᵇ at the other appliable so as to strongly resist removal, this being done by screwing or gluing. One or the other of these closure caps has a puncture-hole 13 therein to provide a vent for the escape of air and gases from within. In applying the wrapped stack into this tube, its loosely overfolded end is disposed preferably toward the closure having the aforesaid vent therein and may advantageously be shaken down to bring its other or closely over-crimped end to bear against the closure without said vent, although this is not essential (see Fig. 5). If desired, a vent hole might be provided in both closure caps, but the single one shown is entirely sufficient.

To assure against either cap being pulled or forced off too easily, an outer wrapper or the manufacturer's label 14 applied to the tube is very desirably extended over the edges or sides of said caps in adhesion thereto by gluing (see Fig. 6). Of course the completed packet or package may in addition be given a protective moisture-proof wrapping as by transparent paper or cellophane, although such should not be applied until the air has been expelled from the tube as next described.

The foregoing steps are conducted preferably in cool atmosphere in order to delay or retard leavening action of the dough, as such action beginning too soon may result in a spoiled product and would at least encumber the wrapping and packeting properly. However, if these steps are accomplished quickly as by fast operating machinery for the purpose, it will make little difference whether the atmosphere is cool or not.

After the attachable cap has been applied, the dough confined within the tube will tend to expand or "rise" with gas generation by its leavening ingredient, especially if laid in a warm place. This leavening action which renders the dough light and fluffy is advantageously induced or promoted at least by subjecting the packet to moderate heat. A more even or level expansion from the action is assured by standing the packet on end during the heat subjection and a more uniform expansion will result from inverting it as shown in Fig. 6 so that the force of gravity will relieve weight pressure on the lower formations.

Said Fig. 6 shows the rolls partially expanded from one toward the opposite end of the tube. They might of course be allowed to expand instead from the center toward both ends. In doing so, they "slip" along the liquid coated wall of the liner or wrapper (10) and the gathering or loose folding of the latter yields spreadingly so as not to restrict it. The lateral expansion coincident with that longitudinally, combined with a natural tendency to hold together in spite of the separators between prevents them from dropping or slipping too freely even in the inverted position of the tube. Continuing expansion within the tube gradually drives air therefrom through said vent hole (13) in one of the closure caps and a certain amount of generated gases of course escape with it. On expanding to the limit in full and tight occupancy of the tube, the air will have been expelled therefrom and a part of the wrapper over the aforesaid top-most (now bottommost) roll will be pressed firmly against the vent in the cap so as to close it. When this sealing is effected, the closure caps may be bulged out somewhat by the pressure as exemplified in Fig. 7 showing the finished product.

This causing the dough to leaven within the packaging container and in so doing to seal the same after first expelling the air is a novel expedient making it practical to commercialize such products, as they may accordingly be indefinitely preserved soft, unspoiled and wholly sanitary. The package or packet moreover is in form admirably suited to handling and exhibiting in trade. Preservation of the packaged product may be prolonged by keeping it in a cool place and better still by refrigeration. For such reason, it is desirable to keep the article in a cool compartment when shipping and retailing to the trade. On opening by breaking or cutting the tube apart and removing the wrapper, the dough formations need only be separated and placed in a pan for baking into fresh hot rolls. The importance and advantage of the invention will accordingly be appreciated.

The described method and means is applicable similarly to bread-loaf, cruller and other dough formations in whatever number it may be desired to package them. While separators would not be required in the case of packeting a single bread-loaf formation, the means and method would be otherwise the same. They may also be applied to packaging shortened or pastry (unleavened) doughs, except that expanding action being then absent, the air expulsion with sealing of the container might have to be accomplished otherwise than by the action of the dough itself.

As the invention may be applied with various modifications to different forms and kinds of dough and to other products as well, without departing from its spirit and scope, the appended claims are not intended to limit the same to the specific form disclosed.

Having thus described my invention, what I claim as new and desire to secure by Letters Patent of the United States is:

1. A method of packeting raw dough preservatively for commercializing purposes, which consists in applying the dough within a closed container having a vent opening in one end, and causing the dough to expand inside the container so as to press tightly over and seal said opening after first expelling the air therethrough from the container.

2. The method of packeting raw dough for commercializing purposes characterized by wrapping and applying the dough in a closed container having a vent and causing the dough to expand and seal over said vent after first expelling the air therethrough from the container.

3. A method of packeting a number of raw dough formations preservatively for commercializing purposes, which consists in applying the formations together with separating material therebetween and with an enveloping material therearound within a closed container having a vent at one end, and causing an expansion of the dough inside the container so as to press over and seal said vent after first expelling the air therefrom by the pressure of expansion.

4. A method of packaging leavened dough formations for preservation in soft fresh condition for baking, which consists in jacketing the formations, applying them jacketed within an inflexible closed container having a vent hole in one end and then causing a leavening action therewithin so as to seal the vent after the air has been expelled by pressure of the expanded dough.

5. A method of packeting a number of raw dough formations preservatively for commercializing purposes, which consists in jacketing the formations together in stack relation with separating material between, applying the jacketed stack in a closed container having an end vent and causing the dough to expand within the container to seal said vent after first expelling the air therefrom.

6. A method of packeting a number of leavened dough formations to preserve them in soft, fresh and baking condition for commercializing purposes, which consists in jacketing the formations together with separating material therebetween, applying the jacketed group within an inflexible closed container having an air vent in one end and then causing a leavening action of the dough within the container so as to expand and press over the vent for sealing the same after first expelling the air therethrough.

7. A method of packeting a number of leavened dough formations to preserve them in soft, fresh and baking condition for commercializing purposes, which consists in placing the formations together in stacked relation with separators of a flexible material between, jacketing the stack together in a flexible sheet of non-adhering material with a folding at the ends permitting expansion without tearing the jacket, placing the jacketed stack in an inflexible closed container having a vent in one end and then causing a leavening action of the dough therewithin so as to expand and seal over the vent by pressure of a part of the jacket thereagainst after first expelling the air therethrough.

8. A method of packeting leavened dough formations for preservation in soft, fresh and baking condition for commercializing purposes, which consists in wrapping the formation in a flexible sheet of non-adhering material, applying the same so wrapped into an inflexible closed container having a vent in one end and then causing a leavening action therewithin so as to seal over the vent by pressure thereagainst after first expelling the air therethrough.

9. The process of preserving unbaked formations of dough in packaged form ready for baking, which consists in jacketing the formations together with separating material between, fitting the same within a container therefor and causing the formations to expand by leavening action within the container so as to seal the latter after first expelling air therefrom by pressure of the expansion.

10. The method of preservatively packaging uncooked leavened dough for commercial purposes, which consists in arranging a separable number of wrapped pieces of the dough in a closed container provided with an air-escape vent, subjecting the filled container to heat so as to expand the dough therewithin by action of the leavening and seal over said vent by pressing a part of the wrapping thereover after first expelling air therethrough and thereafter subjecting the container to a low temperature to arrest the leavening action with the dough in the expanded condition.

11. The method of packeting uncooked dough preservatively for commercializing purposes, which consists in cutting the dough in pieces, arranging the pieces with separators between in a closed non-adhesively lined container having an opening in one of its ends, subjecting the filled container to heat to initiate leavening action and expansion of the dough so as to compress against the ends of the container and to seal the opening in said one thereof, and thereafter subjecting the container to refrigeration to cool the dough and arrest the leavening action thereof in the expanded condition.

12. As an article of manufacture, a container provided with an air vent and having an expanded filling of dough sealing said vent while in the expanded condition and therewithin preserved in fresh soft condition ready for baking on removal.

13. As an article of manufacture, a container having an expanded filling of wrapped dough sealing the same by pressure of a part of the wrapping over an air-escape vent in one end and thereby preserved fresh, soft and ready for baking to edible state on breaking open.

14. As an article of manufacture, a container having an expanded filling of leavened dough formations sealing the same by pressure of the expansion over an air-escape vent in one end and thereby preserved fresh, soft and ready for baking on breaking open; the several formations being jacketed together with a separating material therebetween, but without wrapping individually.

15. As an article of manufacture, a package comprising uncooked pieces of dough partially expanded inside a paper container capped at both ends and having an air-escape vent in one sealed by the dough pressing thereover; said container also having a lining of flexible non-adhering material shielding the dough from its walls.

16. As an article of manufacture, a package comprising a plurality of pieces of leavened dough expanded within a paper tube capped at both ends and having an air-escape vent in one sealed over by the dough pressing thereagainst; the several dough pieces having separating material therebetween and being jacketed unitarily by a sheet of flexible non-adheritive material for insulation from the tube walls.

In testimony whereof I affix my signature.

LIVELY B. WILLOUGHBY.